(12) United States Patent
Zhang

(10) Patent No.: US 9,466,956 B2
(45) Date of Patent: Oct. 11, 2016

(54) HANDHELD WIRE STRIPPER TOOL DEVICE

(71) Applicant: Xiaozhong Zhang, Nashua, NH (US)

(72) Inventor: Xiaozhong Zhang, Nashua, NH (US)

( * ) Notice: Subject to any disclaimer, the term of this patent is extended or adjusted under 35 U.S.C. 154(b) by 97 days.

(21) Appl. No.: 14/446,148

(22) Filed: Jul. 29, 2014

(65) Prior Publication Data

US 2016/0036206 A1    Feb. 4, 2016

(51) Int. Cl.
*H02G 1/12* (2006.01)
*G02B 6/245* (2006.01)

(52) U.S. Cl.
CPC ............ *H02G 1/1217* (2013.01); *H02G 1/126* (2013.01); *H02G 1/1297* (2013.01); *G02B 6/245* (2013.01)

(58) Field of Classification Search
CPC .. G02B 6/245; H02G 1/1204; H02G 1/1202; H02G 1/1217; H02G 1/126; H02G 1/1297
USPC ................. 30/90.4, 91.2, 457, 90.8
See application file for complete search history.

(56) References Cited

U.S. PATENT DOCUMENTS

| | | | |
|---|---|---|---|
| 1,661,056 A * | 2/1928 | Stack ................. | H02G 1/1214 30/294 |
| 1,673,196 A | 6/1928 | Johnson et al. | |
| 1,725,114 A | 8/1929 | Gelderen | |
| 2,239,755 A | 4/1941 | Montgomery | |
| D154,715 S | 8/1949 | Sigoda | |
| 2,513,262 A | 6/1950 | Carpenter | |
| 2,554,126 A | 5/1951 | Schwartz | |
| 2,624,317 A * | 1/1953 | Tall ..................... | B43L 23/04 144/28.71 |
| 2,761,211 A * | 9/1956 | Grant .................. | B23D 21/02 30/90.8 |
| 2,819,520 A * | 1/1958 | Eyles ................... | H02G 1/1217 30/90.8 |
| 2,827,811 A | 3/1958 | Dymeck | |
| 3,044,170 A | 7/1962 | Agombar et al. | |
| 3,114,277 A * | 12/1963 | Clendenin ........... | H02G 1/1214 30/113 |
| 3,161,088 A * | 12/1964 | Tolman ............... | H02G 1/1224 30/90.7 |
| 3,172,615 A | 3/1965 | Manson | |
| 3,309,947 A | 3/1967 | Denney | |
| 3,535,785 A * | 10/1970 | Matthews ........... | H02G 1/1229 30/90.7 |
| 3,611,571 A * | 10/1971 | Belling .............. | H05K 13/0007 30/280 |
| 3,624,901 A * | 12/1971 | Pettit ................... | H02G 1/1229 30/90.4 |
| 3,977,277 A | 8/1976 | Baston et al. | |
| 4,187,745 A | 2/1980 | Lambert | |
| 4,339,967 A | 7/1982 | Greenberg | |
| 4,656,893 A | 4/1987 | Hudson | |
| 4,809,566 A | 3/1989 | Campanella | |
| 4,951,530 A | 8/1990 | Cross | |
| 5,050,302 A * | 9/1991 | Mills .................... | G02B 6/245 30/90.4 |
| D343,626 S | 1/1994 | Fan | |

(Continued)

FOREIGN PATENT DOCUMENTS

GB           722856          2/1955

*Primary Examiner* — Sean Michalski
(74) *Attorney, Agent, or Firm* — Maine Cernota & Rardin

(57) ABSTRACT

A wire stripper tool device is disclosed. The disclosed device comprises a wire retaining dial defining a plurality of graduated holes adjacent to a circumference thereof and an inlet for each hole defined from the circumference to a radius of each hole. The dial is configured to retain and center an insulated wire in one of the graduated holes for a blade to cut the wire through a respective inlet thereof. A spring-loaded two piece body is configured to allow the cutting blade set in a first body piece thereof to be raised and lowered relative to the wire retaining dial set in a second body piece thereof. A limiter set in the first body piece is configured in opposition to a boss in the second body piece. The limiter predetermines a minimum lateral displacement between the two body pieces based on an extension of the limiter relative to the boss.

13 Claims, 6 Drawing Sheets

(56) References Cited

U.S. PATENT DOCUMENTS

| | | | |
|---|---|---|---|
| 5,445,051 A | 8/1995 | Carpenter | |
| 5,542,327 A | 8/1996 | Schultz | |
| 5,577,150 A * | 11/1996 | Holder | G02B 6/4497 30/90.4 |
| 5,797,299 A | 8/1998 | Long, Jr. | |
| 5,979,286 A | 11/1999 | Burth | |
| 5,988,018 A | 11/1999 | Tolbert et al. | |
| 6,018,873 A * | 2/2000 | McClellan | H01B 15/006 30/90.1 |
| 6,581,291 B1 * | 6/2003 | Tarpill | G02B 6/25 30/90.1 |
| 6,643,448 B1 | 11/2003 | Brewer et al. | |
| 7,171,753 B2 * | 2/2007 | Korczak | H02G 1/1224 30/90.1 |
| 7,243,429 B2 * | 7/2007 | Landes | H02G 1/1292 30/90.1 |
| 7,360,566 B2 * | 4/2008 | Chang | B43L 23/00 144/28.5 |
| 8,245,405 B2 * | 8/2012 | Lu | H02G 1/1217 30/90.1 |
| 8,459,317 B2 * | 6/2013 | Hu | B43L 23/002 144/28.1 |
| 2003/0015080 A1 | 1/2003 | Adams | |
| 2003/0196520 A1 | 10/2003 | Locher | |
| 2007/0074409 A1 * | 4/2007 | Hsu | B43L 23/008 30/451 |
| 2010/0319199 A1 * | 12/2010 | Mullaney | B26B 9/00 30/91.1 |
| 2011/0010945 A1 | 1/2011 | Delafosse | |
| 2012/0167719 A1 * | 7/2012 | Newman | H01B 15/006 81/9.51 |
| 2013/0133203 A1 * | 5/2013 | Stocklein | H02G 1/1217 30/90.4 |
| 2013/0133204 A1 | 5/2013 | McDannell | |
| 2014/0215830 A1 * | 8/2014 | Ducret | H02G 1/1217 30/90.9 |

* cited by examiner

HANDHELD WIRE STRIPPER TOOL DEVICE

BACKGROUND OF THE INVENTION

The designer of a wire stripper machine for metal reclamation is conventionally faced with 2 major technical requirements: driving an insulated wire through the machine and making a cut on the wire insulation. The two main means of guiding the driving of a wire are an adjustable one-hole (one-hole-fits-all) guide and a nonadjustable hole, or minimally adjustable multiple-hole guide means. Either means may apply to single-entrance wire strippers and multiple-entrance wire strippers.

An adjustable, one-hole stripper machine must be able to fit wires ranging from a very small diameter to a very large diameter. Its wire drive wheel must also have good contact with the wire in order to provide sufficient traction and to fix the wire at a desirable location. With the blade at an appropriate height, a continuous longitudinal cut can be made as the wire is driven through the stripper machine.

Many techniques have been tried in the prior art to keep the wire at the center of a cutting blade. Some examples are an input plate which restrains the wire at a distance from the blade and an input tube which inserts into the hole on the input plate and restrains the wire at a closer distance from the cutting blade. Whichever technique is used, it is critical to accurately retain the insulated wire at the center of the cutting blade during the entire stripping process.

There are also less common strippers that sit in between the aforementioned stripper machine types. Although it drives wire better, a multiple-hole type wire stripper requires multiple blades which leads to higher cost, size, and weight. None of the prior art solutions can offer satisfactory results because they don't offer restrictions at the critical plane perpendicular to the blade where wire escape takes place. Therefore, there has been a long felt need in the market for a multiple-hole stripper machine with a single cutting blade.

SUMMARY OF THE INVENTION

A wire stripper tool device is disclosed. The disclosed device comprises a wire retaining dial defining a plurality of graduated holes adjacent to a circumference thereof and an inlet for each hole defined from the circumference to a radius of each hole. The dial is configured to retain and center an insulated wire in one of the graduated holes for a blade to cut the wire through a respective inlet thereof. A spring-loaded two piece body is configured to allow the cutting blade set in a first body piece thereof to be raised and lowered relative to the wire to retaining dial set in a second body piece thereof.

A limiter set in the first body piece is configured in opposition to a boss in the second body piece. The limiter predetermines a minimum lateral displacement between the two body pieces based on an extension of the limiter relative to the boss. Each inlet is notched to allow the cutting blade to pass into the hole but not allow a wire passing there through to escape the wire retaining dial. The graduated holes include circular holes for single insulated wires and rectangular holes configured to receive sheathed cable of multiple insulated wires to enable a stripping of the sheath.

A method for reclaiming metals from insulated wire, comprising pulling the wire through one of a plurality of graduated holes adjacent to a circumference of a wire retaining dial configured for a blade to laterally cut an insulation of the wire through a respective inlet defined from the circumference to a radius of each hole. The dial is configured to retain and center the insulated wire in one of the graduated holes. The method further includes laterally cutting the insulation on the wire via the cutting blade set in a first body piece to be raised and lowered relative to the wire retaining dial set in a second body piece of a compressible spring-loaded two piece body.

Other aspects and advantages of embodiments of the disclosure will become apparent from the following detailed description, taken in conjunction with the accompanying drawings, illustrated by way of example of the principles of the disclosure herein.

Figure 1:
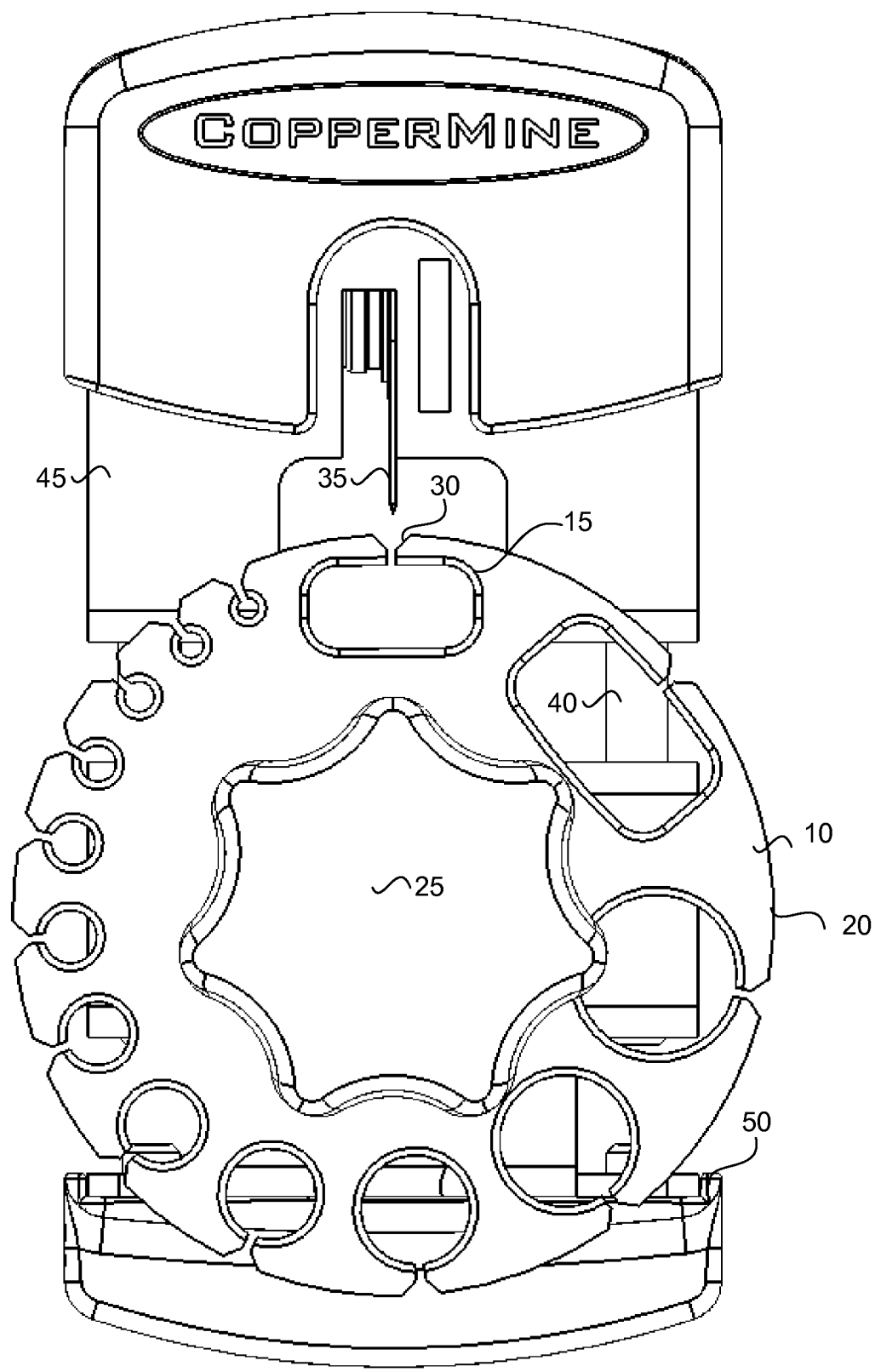
FIG. 1 is a front elevational view of a handheld wire stripper device depicting an insulated wire retaining dial, a two piece body and a cutting blade in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

FIG. 1 is a front elevational view of a handheld wire stripper device depicting an insulated wire retaining dial, a two piece body and a cutting blade in accordance with an embodiment of the present disclosure. The disclosed tool is a very portable device for quickly and easily stripping wires, intended for metal recovery. The disclosed tool includes a rotatable dial 10 configured to retain and allow several different sizes and shapes of insulated wire to pass through it. Throughout the disclosure, use of the term 'dial' refers to a common definition of a circular disk or plate. The dial is rotatable by a knob 25 which is in connected thereto. The knob may comprise a wing nut which further tightens on a post for the dial 10 and secures it thereto. The dial 10 defines a graduated series of circular and rectangular holes adjacent to a perimeter 20 of the disk 10. Rectangular holes, of which hole 15 is typical, may receive and enable stripping sheathed cable. Each hole comprises a notched or chamfered inlet 30 from the circumference 20 of the dial. The notched inlet of a hole is configured to allow a cutting blade 35 to pass there through and cut an insulation of a wire passing through the respective hole. A hole may be predesigned to closely match an insulated wire gauge.

A user may select a hole for an insulated wire with a tolerance to allow the user to easily pull the insulated wire there through. The notched or chamfered inlet 30 allows some tolerance between the placement of the dial 10 and contact of the blade 35 to the wire insulation for a quick cutting and stripping process. The inlet 30 however is notched only enough to allow passage of the blade 35 into the respective hole but not large enough for the insulated wire to escape the wire retaining dial 10. The circumference 20 of each hole in the dial may also be chamfered to allow a quick and easy insertion of an insulated wire there through.

Figure 2:
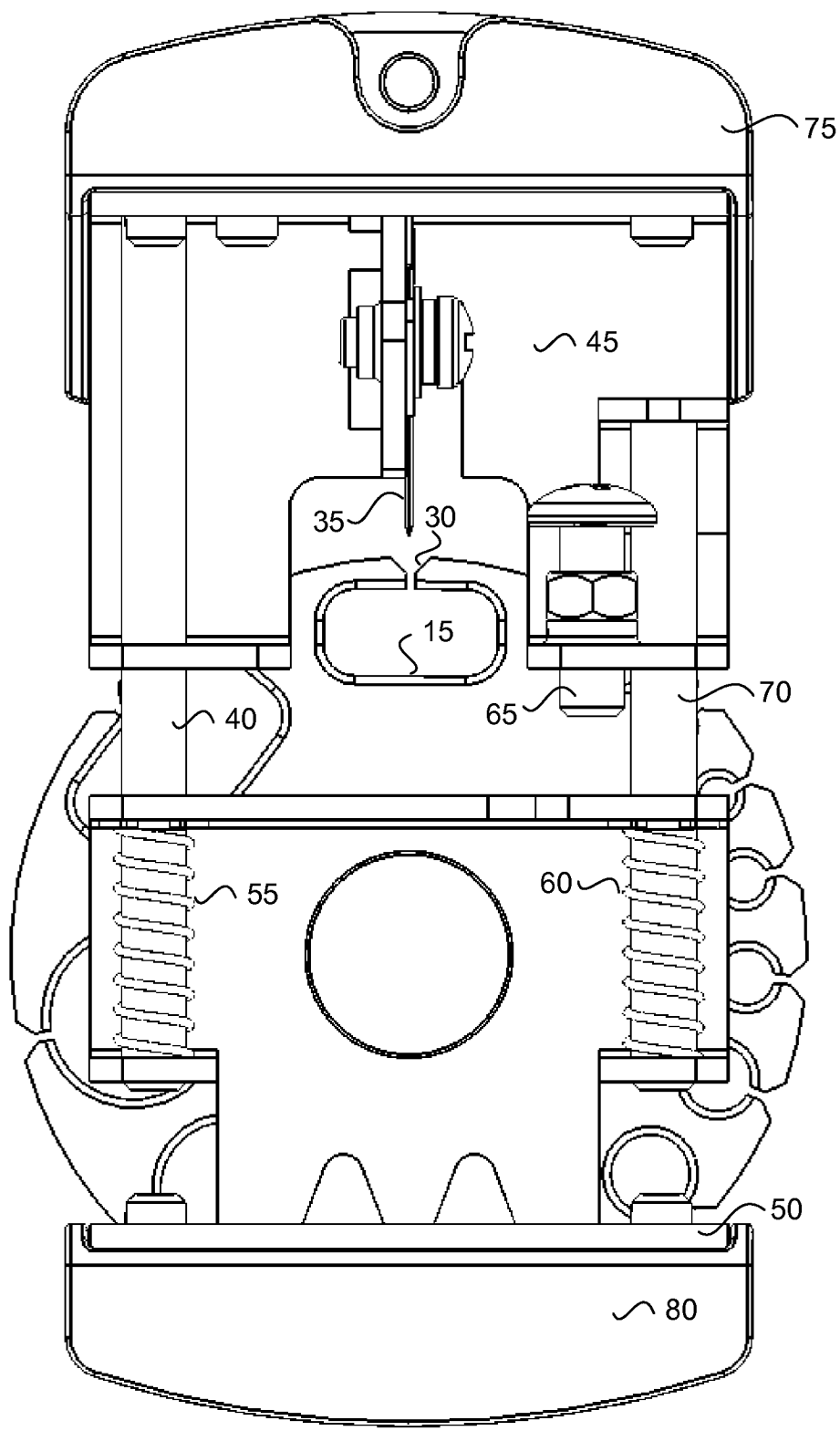
FIG. 2 is a back elevational view of the handheld wire stripper device depicting, among other features, the spring loaded rods and the limiter in accordance with an embodiment of the present disclosure.

FIG. 2 is a back elevational view of the handheld wire stripper device depicting, among other features, the spring loaded rods and the limiter in accordance with an embodiment of the present disclosure. A spring-loaded two piece body allows a user to easily retract the blade 35 from the dial 10, allowing free rotation of the dial or unobstructed wire insertion. Springs 55 and 60 encircle the body rods 40 and 70 which connect the two body pieces 45 and 50. When the both ends of the body 45 and 50 are grasped or depressed, the dial 10 is restrained by two retaining clips (not depicted) in a first piece of the body which clamp down on the dial disposed on a second body piece. Alternatively, the knob 25 may also be torqued to secure the dial 10 to the second body piece 50. The blade 35 cuts into the insulation of the wire in a dial hole at a predetermined depth set by a limiter 65 discussed below.

The retaining clips may fix the dial in place by friction, a ratchet action or an interaction between protrusions on the dial 10 and the retaining clips. A clamping knob 25 is set in the first body piece may also fix the dial 10 in place relative to the cutting blade 35 set in the first body piece 45. The dial 10 may therefore have indicia bumps on a face thereof to interact with the retaining clips. By pulling the wire through the device, it may make a continuous cut along the insulation of the wire. The metal can be pulled out of the insulation by hand. Once the insulation has been removed from the wire, a user is left with the bare metal material within that may be reclaimed and recycled for new wire.

Figure 3:
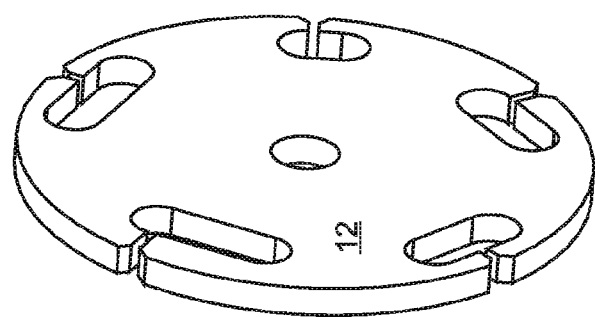
FIG. 3 is a perspective view of the handheld wire stripper device to depicting a molded grip for each body piece in accordance with an embodiment of the present disclosure.
Figure 3:
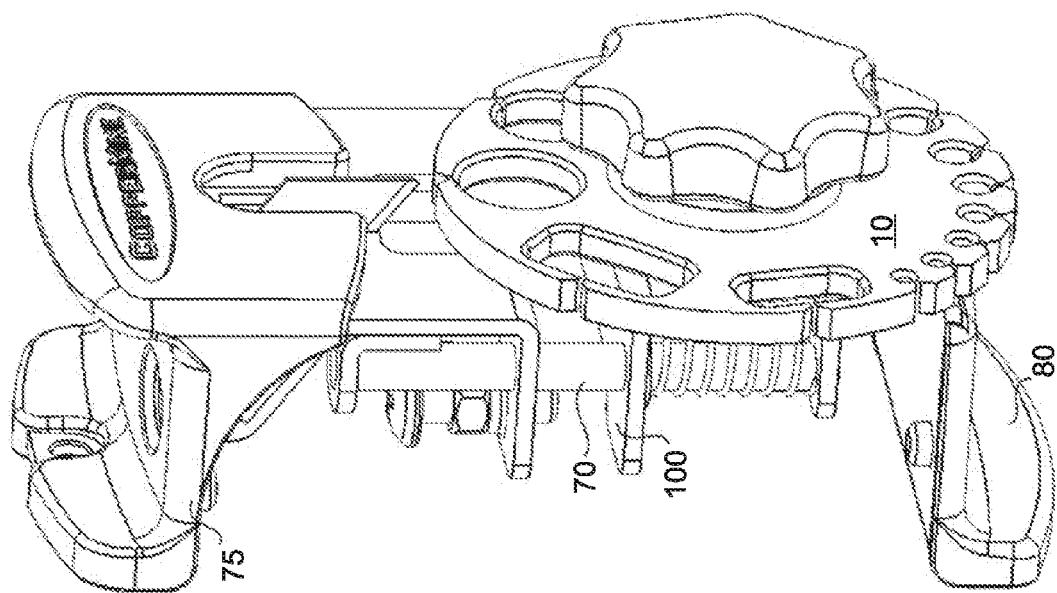

The rotatable dial 10 has several entries for different sizes and shapes 20 of insulated wire. With reference to FIG. 3, embodiments of the disclosure include interchangeable and different dials 12 to accommodate a large range of different types and sizes of insulated wires. The entry point for blade 35 is precisely and well-fitted to the radius of an insulated wire inserted through the rotatable dial 10. Therefore, the insulated wire is completely prohibited from escaping the blade tip. Because the 25 blade tip sits radially in a predetermined gap or wire size opening or hole on the dial 10, the dial 10 protects the blade from moving side to side during cutting. Therefore the blade 35 doesn't need to be designed or engineered to be strong enough to endure stiff wires or excessive pulling force. Only one cutting blade 35 is needed for all size wires.

In an embodiment of the handheld wire stripper, a body thereof comprises two pieces connected by spring-loaded rods 55 and 60. The body pieces 45 and 50 may be comprised of metal or any sufficiently rigid material. The body pieces 45 and 50 are graspable by a user in one hand. Ergonomic and molded grips 75 and 80 fit an exposed end of each body piece 45 and 50 to enable a user to ergonomically grasp the wire stripper tool in one hand. The spring-loaded rods 40 and 70 allow the blade 35 set in a first body piece 45 to be raised out of the way when an insulated wire is inserted into a wire sizing gap on the rotatable dial 10 disposed in the second body piece 50. This is where the blade depth is controlled. A user wants the blade to cut the insulation of the wire but not be in contact with the metal itself to allow a smooth stripping process without wearing down a stripper blade. Adjusting the blade depth into the wire insulation is easily controlled by a limiter 65 between the two pieces of body metal or the grasp.

FIG. 3 is a perspective view of the handheld wire stripper device depicting a molded grip for each body piece in accordance with an embodiment of the present disclosure. The molded and ergonomic ends 75 and 80 are depicted. The limiter 65 may comprise a screw set into and laterally extending from a first body piece to a boss of the second body piece. Turing the screw or limiter 65 set in the first body piece advances an end of the limiting screw closer to a boss 100 of the second body piece 50. Therefore, the predetermined displacement of the limiter screw limits how closely the second and first body pieces may be grasped together and accordingly limits the depth of the cutting blade into the insulation of an insulated wire.

In other words, moving the screw or limiter 65 up away from the boss 100 of the second body piece 50 will increase a cutting blade's depth into an insulated wire in the rotatable dial disposed on the second body piece 50. Conversely, moving the screw 65 downward and toward the boss 100 the second body piece 50 will decrease the cutting blade's depth into the insulated wire in the rotatable dial 10. Other figures may depict same or similar features using same or similar reference numbers. Same or similar features for other figures not described in the present figure may be the same or similar thereto.

Figure 4:
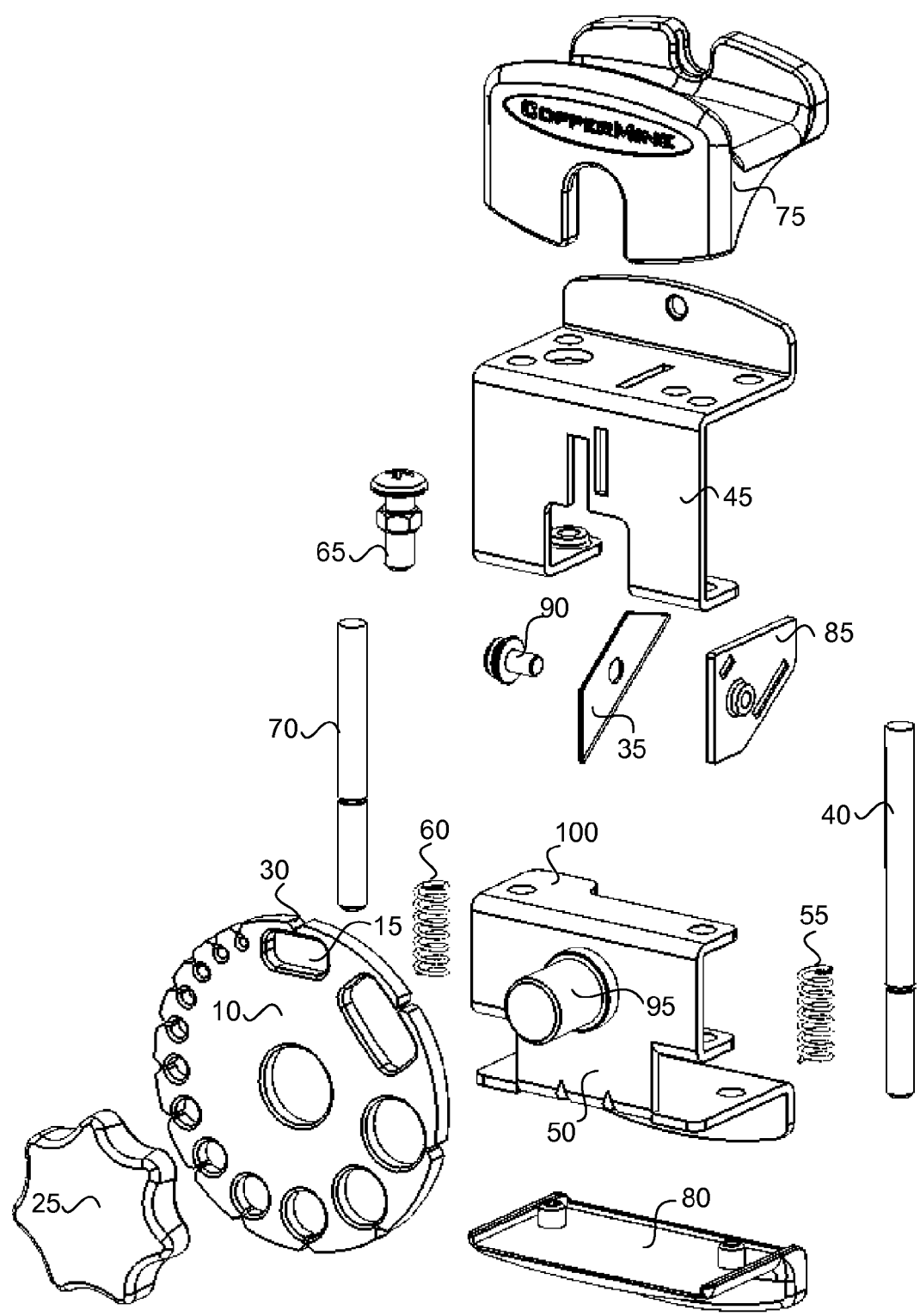
FIG. 4 is an exploded view of the handheld stripper device depicting discrete components in perspective and relative position in accordance with an embodiment of the present disclosure.

FIG. 4 is an exploded view of the handheld stripper device depicting discrete components in perspective and relative position in accordance with an embodiment of the present disclosure. The disclosed handheld wire stripper device also includes a blade-holder 85. The blade-holder 85 is designed to hold and secure easily-replaceable and commercially-available blades in relation to the first body piece 45. The blade holder 85 includes a receiving piece for the thread end of the retaining screw 90. The receiving piece may be designed to hold a first edge of a trapezoidal blade against the first body piece 45 and a second edge of the blade against the insulated wire. Once a blade wears out on one end, a user may take the blade out from the holder 85 and screw 90 and flip the blade around for use of the other cutting end in stripping wires.

Figure 5:
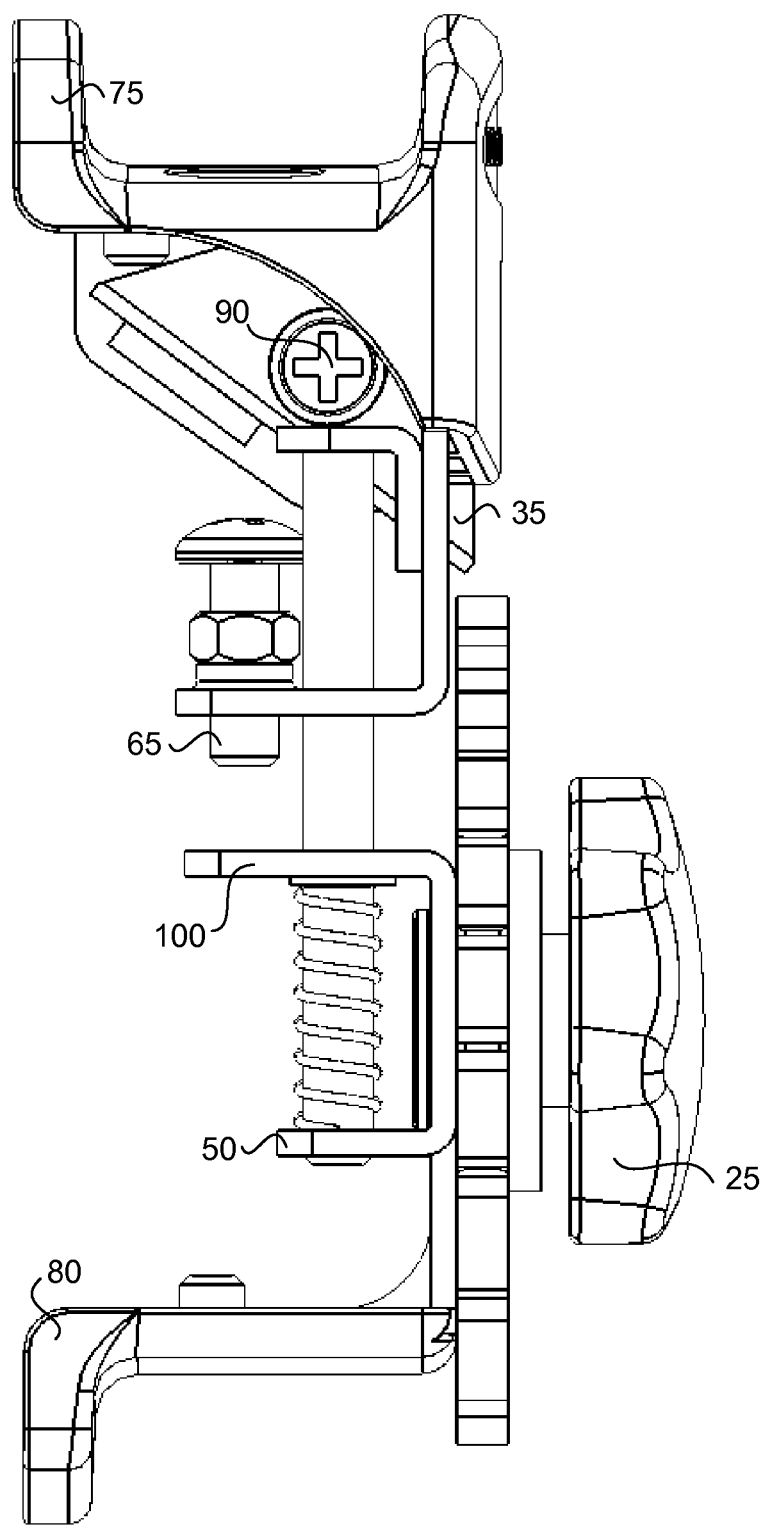
FIG. 5 is a side elevational view of the handheld stripper device depicting the boss on the second body piece for the limiter of the first body piece in accordance with an embodiment of the present disclosure.

FIG. 5 is a side elevational view of the handheld stripper device depicting the boss on the second body piece for the limiter of the first body piece in accordance with an embodiment of the present disclosure. The depiction shows the blade holder screw 90, the blade 35 cutting edge and the second body piece 50 to limiter boss 100 from a side view. Also the ergonomic and molded pieces 75 and 80 are shown from a side view. Other figures may depict same or similar features using same or similar reference numbers. Same or similar features for other figures not described in the present figure may be the same or similar thereto.

Figure 6:
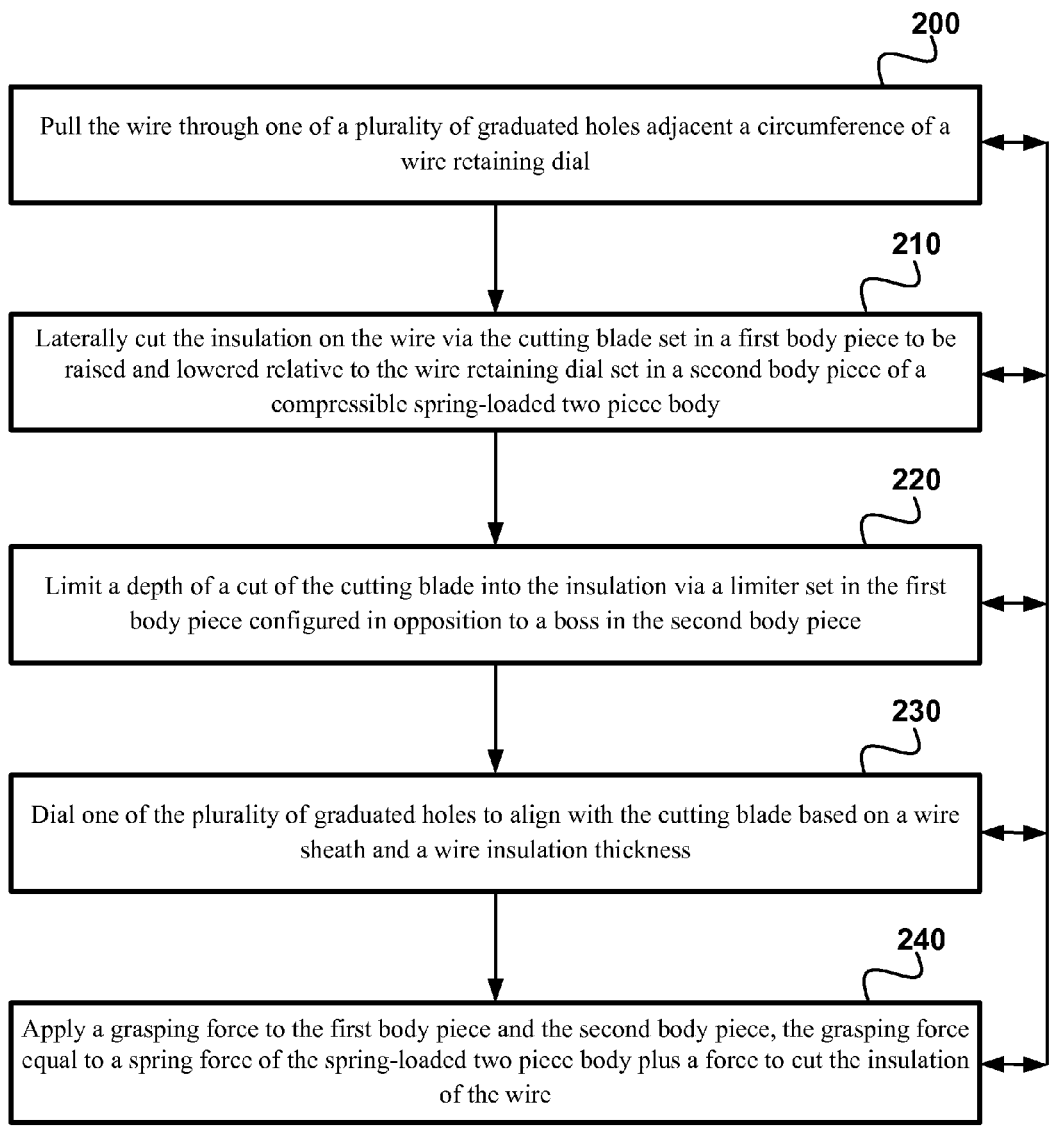
FIG. 6 is a block diagram of a method for reclaiming metal from insulated wires using a hand held wire stripper tool with a wire retaining dial in accordance with an embodiment of the present disclosure.

FIG. 6 is a block diagram of a method for reclaiming metal from insulated wires using a hand held wire stripper tool with a wire retaining dial in accordance with an embodiment of the present disclosure. The method for reclaiming metals from insulated wire comprises 200 pulling the wire through one of a plurality of graduated holes adjacent to a circumference of a wire retaining dial. The wire retaining dial is configured for a blade to laterally cut an insulation of the wire through a respective inlet defined from the circumference to a radius of each hole. The dial is also configured to retain and center the insulated wire in one of the graduated holes.

In an embodiment of the disclosure, a non-circular plate such as a rectangle plate, may replace the wire retaining dial on the handheld stripper tool. A rectangular plate comprises the same or similar holes and notches along a longitudinal dimension of the plate to receive the insulated wire and retain it for cutting via the blade. A hole and notch may be selected via a linear motion of the rectangular plate which includes straight as well as circular holes or slots.

The disclosed method also includes 210 laterally cutting the insulation on the wire via the cutting blade set in a first body piece to be raised and lowered relative to the wire retaining dial set in a second body piece of a compressible spring-loaded two piece body. The method additionally includes 220 limiting a depth of a cut of the cutting blade into the insulation via a limiter set in the first body piece configured in opposition to a boss in the second body piece. The limiter is configured to predetermine a minimum lateral displacement between the two body pieces based on an extension of the limiter toward the boss.

An embodiment of the method for reclaiming metals from insulated wires may include 230 dialing one of the plurality of graduated holes to align with the cutting blade based on a wire sheath and a wire insulation thickness. The method may also include 240 applying a grasping force to the first body piece and the second body piece, the grasping force equal to a spring force of the spring-loaded two piece body plus a force to cut the insulation of the wire. The method may further include 250 limiting a grasping force of the cutting blade into the insulation based on a limiter configured to allow the cutting blade to laterally contact a bare wire portion of the insulated wire.

The laterally cut wire may be removed by releasing the grip on the two body pieces and allowing the springs to remove the blade from the insulated wire. The disclosed tool is then ready to receive another wire of the same or different gauge for stripping. Another hole may be selected and the tool may be grasped for cutting and stripping the subsequent insulated wire. The wire insulation may be removed from the metal wire at the lateral cut and the metal may be recycled in an independent step.

The non-obvious and novel features and advantages of the present disclosure are not limited by to a handheld wire stripper application but may also be used in other types of wire strippers, such as table mount, floor type, manual and powered strippers alike.

The present disclosure may be used on many types of wire strippers, i.e. manual or powered, rotating blade or stationary blade types. The present disclosure may also be used on an adjustable-hole wire stripper. The present disclosure satisfies the long felt need in the market place for a multiple-hole stripper machine with a single cutting blade. The present disclosure is very portable, small, effective and easy to use and only requires grip force and pulling force of a user. It may be used for small volume metal reclamation or in the field where it is not practical to carry a powered stripper machine.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents to be included by reference in a non-provisional utility application.

What is claimed is:

1. A wire stripper tool, comprising:
   a tool body;
   a wire retaining dial defining a plurality of graduated holes adjacent to a circumference thereof, said dial being mountable to said body and rotatable about a central axis so as to select any one of said holes from among said plurality of holes:
   an inlet for each hole, the inlets providing passages from the circumference of the dial to each of the respective holes; and
   a blade, mounted to the tool body and configured for alignment with the central axis of the dial and insertion through the inlet of the selected hole,
   the dial being configured to retain and center an insulated wire in the selected hole so that the blade is able to cut the wire along its length through the respective inlet as the wire is pulsed through the selected hole.

2. The wire stripper tool of claim 1, further comprising a two piece body configured to allow the cutting blade set in a first body piece thereof to be raised and lowered relative to the wire retaining dial set in a second body piece thereof.

3. The wire stripper tool of claim 2, further comprising at least one spring-loaded rod configured to connect the two body pieces, the spring-loaded rod(s) being configured to extend from the first body piece to the second body piece.

4. The wire stripper tool of claim 1, further comprising a plurality of wire retaining dials configured for interchangeable mounting to said tool body, the holes of the dials varying in at least one of size and shape.

5. The wire stripper tool of claim 1, further comprising a clamp configured to mechanically retain the dial in a preselected rotational position based on the minimum displacement between the two body pieces.

6. The wire stripper tool of claim 1, wherein a circumference of each graduated hole is chamfered to enable a quick and easy insertion of an insulated wire there through.

7. The wire stripper tool of claim 1, wherein each inlet is chamfered to allow a tolerance between a placement of the wire retaining dial relative to the cutting blade for a quick cutting process.

8. The wire stripper tool of claim 1, further comprising a blade holder including a receiving boss for a thread end of a retainer screw configured to hold a cutting edge of a trapezoidal blade against the insulated wire.

9. A handheld wire stripper device, comprising:
a tool body;
a wire retaining dial defining a plurality of graduated holes adjacent to a circumference thereof and an inlet for each hole, said dial being mountable to said body and being rotatable about a central axis so as to select any one of said holes from among said plurality of holes, the inlets providing passages from the circumference of the dial to each of the holes, the dial being configured to retain and center an insulated wire in the selected hole;
the tool body being a spring-loaded two piece body, a cutting blade being set in a first body piece thereof and being configured to be raised and lowered relative to the wire retaining dial, which is set in a second body piece thereof, so that when the cutting blade is lowered it is aligned with the central axis of the dial and able to pass through the inlet of the selected hole and to cut the wire retained therein along its length as the wire is pulled through the selected hole; and
a limiter set in the first body piece and configured in opposition to a boss in the second body piece, the limiter being configured to predetermine a maximum penetration of the cutting blade through the inlet of the selected hole based on the limiter and the boss.

10. The handheld wire stripper device of claim 9, further comprising a post configured to extend from the second body piece and a knob configured to rotate on the post, the knob configured to engage the wire retaining dial and enable a user to rotate and secure the dial to a selected wire size hole aligned with the cutting blade.

11. The handheld wire stripper device of claim 9, wherein the limiter comprises a screw set into and extending from the first body piece to the boss of the second body piece, the limiter being configured to advance an end of the limiting screw closer to the boss of the second body piece based on a rotation of the screw and limit a cutting depth of the blade into the insulated wire.

12. The handheld wire stripper device of claim 9, wherein the plurality of graduated holes include rectangular holes configured to receive sheathed cable and enable a stripping of the sheath.

13. The handheld stripper device of claim 9, wherein the wire retaining dial comprises protrusions on a face thereof, the protrusions being configured to interact with at least one retaining clip extending from the first body piece and retain the dial in a fixed rotary position based on the minimum displacement between the two body pieces.

* * * * *